US008965829B2

(12) United States Patent
Pattillo

(10) Patent No.: US 8,965,829 B2
(45) Date of Patent: Feb. 24, 2015

(54) SYSTEM AND METHOD FOR MAKING DECISIONS USING NETWORK-GUIDED DECISION TREES WITH MULTIVARIATE SPLITS

(71) Applicant: Jeffrey L. Pattillo, Carrollton, TX (US)

(72) Inventor: Jeffrey L. Pattillo, Carrollton, TX (US)

( * ) Notice: Subject to any disclaimer, the term of this patent is extended or adjusted under 35 U.S.C. 154(b) by 256 days.

(21) Appl. No.: 13/764,685

(22) Filed: Feb. 11, 2013

(65) Prior Publication Data

US 2013/0212058 A1   Aug. 15, 2013

Related U.S. Application Data

(60) Provisional application No. 61/597,160, filed on Feb. 9, 2012.

(51) Int. Cl.
*G06F 17/00* (2006.01)
*G06N 5/02* (2006.01)

(52) U.S. Cl.
CPC ..................................... *G06N 5/025* (2013.01)
USPC ........................................................ 706/47

(58) Field of Classification Search
USPC ........................................................... 706/47
See application file for complete search history.

(56) References Cited

U.S. PATENT DOCUMENTS

| | | | | |
|---|---|---|---|---|
| 6,604,114 B1 * | 8/2003 | Toong et al. | ........................ | 1/1 |
| 7,111,010 B2 * | 9/2006 | Chen | ........................ | 1/1 |
| 7,171,405 B2 * | 1/2007 | Toong et al. | ........................ | 1/1 |
| 7,672,950 B2 * | 3/2010 | Eckardt et al. | ........... | 707/999.01 |
| 8,213,261 B2 * | 7/2012 | Imhof et al. | ..................... | 367/38 |
| 8,281,297 B2 * | 10/2012 | Dasu et al. | ..................... | 717/161 |
| 8,447,524 B2 * | 5/2013 | Chen et al. | ....................... | 702/16 |
| 8,477,147 B2 * | 7/2013 | Livingston et al. | ........... | 345/581 |
| 8,548,231 B2 * | 10/2013 | Shet et al. | ..................... | 382/156 |
| 8,560,346 B2 * | 10/2013 | Bundschus et al. | ............... | 705/3 |
| 8,646,085 B2 * | 2/2014 | Norrman et al. | ................. | 726/25 |
| 8,909,685 B2 * | 12/2014 | Scheu et al. | .................. | 708/300 |

OTHER PUBLICATIONS

Interactive Exploration and Analysis of Large-Scale Simulations Using Topology-Based Data Segmentation, Bremer, P.-T. ; Weber, G. ; Tierny, J. ; Pascucci, V. ; Day, M. ; Bell, J. Visualization and Computer Graphics, IEEE Transactions on vol. 17 , Issue: 9 DOI: 10.1109/TVCG.2010.253 Publication Year: 2011 , pp. 1307-1324.*
Efficient Methods to Compute Optimal Tree Approximations of Directed Information Graphs, Quinn, C.J. ; Kiyavash, N. ; Coleman, T.P. Signal Processing, IEEE Transactions on vol. 61 , Issue: 12 DOI: 10.1109/TSP.2013.2259161 Publication Year: 2013 , pp. 3173-3182.*
A technique to incorporate new information in evaluating generation alternatives, Rahman, S. ; Shrestha, G. Power Industry Computer Application Conference, 1991. Conference Proceedings DOI: 10.1109/PICA.1991.160658 Publication Year: 1991 , pp. 77-83.*

(Continued)

*Primary Examiner* — Michael B Holmes
(74) *Attorney, Agent, or Firm* — Jack D. Stone, Jr., Esq.; Scheef & Stone, L.L.P.

(57) ABSTRACT

Disclosed herein is a system and method for splitting data using graph theory with more precision than traditional decision trees, but less work than an exhaustive listing of all possible groups. Accordingly, a set of attributes is found for which corresponding data gives a highest score, the score being a function of data attributes, such as count and purity.

7 Claims, 3 Drawing Sheets

(56) References Cited

OTHER PUBLICATIONS

A technique to incorporate new information in evaluating generation alternatives, Rahman, S. ; Shrestha, G. Power Systems, IEEE Transactions on vol. 7 , Issue: 2 DOI: 10.1109/59.141802 Publication Year: 1992 , pp. 900-906.*

Basak, Jayanta; "Online Adaptive Hierarchical Clustering in a Decision Tree Framework;" Journal of Pattern Recognition Research; 2011; pp. 201-229; Bangalore, India.

Friedman, Jerome H., Ron Kohavi, and Yeogirl Yun; "Lazy Decision Trees;" AAAI-96 Proceedings; Learning; 1996; pp. 717-724; US.

Ho, K. M., and P. D. Scott; "Overcoming Fragmentation in Decision Trees Through Attribute Value Grouping;" Dept. of Comp. Sci.; Univ of Essex; Colchester, UK.

Kohavi, Ron and Chia-Hsin Li; "Oblivious Decision Trees, Graphs, and Top-Down Pruning;" Learning; Stanford Univ. Comp. Sci. Dept; Stanford, CA; pp. 1071-1077.

Li, Jinyan and Limsoon Wong; "Solving the Fragmentation Problem of Decision Trees by Discovering Boundary Emerging Patterns;" Laboratories for Information Technology; Singapore.

Liu, Huan and Rudy Setiono; "Feature Transformation and Multivariate Decision Tree Induction;" DS'98; LNAI 1532, pp. 279-291; 1998.

Mahmood, Ali Mirza, Naganjaneyulu Satuluri, and Mrithyumjaya Rao Kuppa; "An Overview of Recent and Traditional Decision Tree Classifiers in Machine Learning;" Int'l J. of Research and Reviews in Ad Hoc Networks; Mar. 2011; pp. 9-12; vol. 1, No. 1; Science Academy Publisher; UK.

Makkithaya, Krishnamoorthi, N. V. Subba Reddy, and U. Dinesh Acharya; "Improved C-Fuzzy Decision Tree for Intrusion Detection;" World Academy of Science, Engineering and Technology 42 2008; pp. 273-277.

Murthy, Sreerama K.; "Automatic Construction of Decision Trees from Data: A Multi-Disciplinary Survey;" Kluwer Academic Publishers; pp. 1-49.

Pattillo, Ph.D., Jeffrey L.; "Using Graphs to Guide Induction for Classifiers;" Jul. 23, 2012.

Pattillo, Jeffrey L.; "System and Method for Making Decisions Using Network-Guided Decision Trees with Fused Branches;" 2012.

Quinlan, J. R.; "C4.5: Programs for Machine Learning;" 1993; Morgan Kaufmann Publishers; CA. http://amazon.com/C4-5-Programs-Machine-Learning-Kaufmann/dp/1558602380/ref=pd_bxgy_b_img_y.

Tamai, Tetsuo and Masayuki Fujita; "Development of an Expert System for Credit Card Application Assessment."

Vilalta, R. Valerio, F. Ocegueda-Hernandez, G. Watts, and M. Siller; "The Effect of the Fragmentation Problem in Decision Tree Learning Applied to the Search for Single Top Quark Production;" US and Mexico.

Vilalta, Ricardo, Gunnar Blix and Larry Rendell; "Global Data Analysis and the Fragmentation Problem in Decision Tree Induction;" Beckman Institute and Comp. Sci. Dept; Univ. of Ill.; US.

Wang, Haixun and Carlo Zaniolo; "CMP: A Fast Decision Tree Classifier Using Multivariate Predictions;" Comp. Sci. Dept; UCLA.

Wu, Xindong, Vipin Kumar, J. Ross Quinlan, Joydeep Ghosh, Qiang Yang, Hiroshi Motoda, Geoffrey J. McLachlan, Angus Ng, Bing Liu, Philip S. Yu, Zhi-Hua Zhou, Michael Steinbach, David J. Hand, and Dan Steinberg; "Top 10 algorithms in data mining;" Knowledge Inf Syst (2008) 14:1-37; Jul. 9, 2007; Springer-Verlag London Limited 2007.

Zaki, Mohammed, Markus Peters, Ira Assent, and Thomas Seidl; "CLICKS: An Effective Algorithm for Mining Subspace Clusters in Categorical Datasets;" KDD '05, Aug. 21-24, 2005, Chicago, IL, US.

Cohen, W.W.; "Fast Effective Rule Induction;" proceedings of the 12th International Conference on machine Learning; AT&T Bell Laboratories; NJ; 1995.

Cohen, W.W. and Y.A. Singer; "Simple, Fast, and Effective Rule Learner;" Proceedings of the 16th International Conference on Artificial Intelligence; AT&T Labs Research; NJ; 1999.

Frank, E. and I. H. Witten; "Generating Accurate Rule Sets Without Gloval Optimization;" Proceedings of the Fifteenth International Conference on Machine Learning; pp. 144-151; Univ. of Waikato; New Zealand; 1998.

Freund, Y. and R. E. Schapire; "Experiments With a New Boosting Algorithm;" Proceedings of the Thirteenth International Conference on Machine Learning; AT&T Laboratories; NJ; 1996.

Kotsiantis, S. B.; I. D. Zaharakis and P. E. Pintelas; "Machine Learning: A Review of Classification and Combining Techniques;" Artif. Intell. Rev.; pp. 159-190; 2006.

Rokach, L. and O. Maimon; "Data Mining With Decision Trees;" http://books.google.com/books? hl=en&lr=&id=GIKIIR78OxkC&oi=fnd&pg=PR7&dq=data+mining+with+decision+trees+rokach&ots=0_4EIT-dTW&sig=JPi2bZF8lCsmm5uVCyE4U4sf5kU#v=onepage&q=date%20mining%20with%20decision%20trees%20rokach&f=false.

Sun, Y. and J. Li; "Two New Regularized Adaboost Algorithms;" International Conference on Machine Learning and Applications; 2004; USA.

* cited by examiner

SYSTEM AND METHOD FOR MAKING DECISIONS USING NETWORK-GUIDED DECISION TREES WITH MULTIVARIATE SPLITS

CROSS-REFERENCE TO RELATED APPLICATIONS

This application claims the benefit of U.S. Provisional Application No. 61/597,160, filed Feb. 9, 2012, which application, including appendices, is hereby incorporated herein by reference, in its entirety.

TECHNICAL FIELD

The invention relates generally to data mining and graph theory and, more particularly, to solving problems using decision trees or a rules-based classifier.

BACKGROUND

Companies have a plethora of data linking objects and their measurements to an ultimate outcome. They want to use this data to make better future decisions. For example, baseball scouts have information about bat speed, batting order, batting average, and many other statistics linked to players they would like to duplicate or avoid. They use this information to help them draft better players. Credit card companies gather information about potential customers to assess if a potential customer is a credit risk based on the credit history of customers with similar attributes. Medical researchers gather information for various settings of parameters in hopes of identifying combinations of the parameters that lead to a typically positive outcome.

A difficulty in making good decisions is that objects with similar attributes often produce different outcomes. With enough attributes, any two objects with different outcomes can be placed in separate groups, but the groups might be so specific that very little data exists. A confident decision cannot be made on such little information.

Therefore, what is needed is a system and method for determining how to optimally separate objects in a data set into groups with a similar outcome.

One way in which this problem has been solved in the past is by examining all possible sets of attributes and their associated outcomes, assuming possession of a set of attributes from which at least some groups with clear outcome can be identified. However, such a list is often infeasible to make, so a tool known as a decision tree is often employed instead.

Decision trees divide objects into sets according to attributes. They cut down the list of groups mentioned above to a feasible size. In order to do so, they give preference to some attributes over others, that is, decision trees consider more groups for attributes examined early in the decision tree. Decision trees also cut down the list of potential groups by "pruning branches" with a "clear" outcome.

While pruning branches and giving preference to attributes cuts down the list of groups that need to be considered to a manageable size, they also constitute the well-known flaws of decision trees. The order in which attributes are considered significantly affects the utility of a decision tree, and it is often not clear what is the best order in which to consider attributes. Further, branches are often pruned before all information is available in order to save work, and so groups with different outcomes that might be separated are often lumped together.

Decision trees also have a flaw fundamental to their design. Traditionally, the branches of decision trees partition objects into disjoint sets. As soon as objects are split, they cannot be reunited. It is often the case that the unclassified objects, upon completion of a decision tree, are part of a group with a clear outcome, but were split off from the members of their group. Multiple decision trees are the only way to rectify the issue, which quickly grows and become infeasible to build.

Therefore, in addition to the foregoing, what is further needed is a system and method for grouping data that takes the order of attributes, the lack of precision due to pruning, and the requirement that objects be partitioned into disjoint sets out of the equation, so that better decisions can be made.

SUMMARY

The present invention, accordingly, provides a system and method for splitting data using graph theory with more precision than, and without the fundamental flaws of, traditional decision trees, but with less work than an exhaustive listing of all possible groups. Accordingly, a set of x attributes is found for which corresponding data gives a highest score, the score being a function of data attributes, such as support and purity of outcome. This is accomplished by gathering from raw data pairwise statistics and building an attribute graph for an outcome "u", the raw data comprising information about the attributes of an object and its ultimate outcome. High weight subgraphs of x vertices are found that will correspond to collections of x attributes, wherein S refers to the set of all high weight subgraphs found. Collections from the set S that meet a pre-defined standard are accepted, and data of all accepted groups is removed from the raw data. A determination is then made whether more groups can be accepted without lowering the standards, and if they cannot, then the standards are lowered. If the standards are lowered or it is determined that more groups can be accepted without lowering the standards, then a determination is made whether more groups are desired. If it is determined that more groups are desired, then execution returns to the step of gathering; otherwise, all accepted groups are added to the precision decision tree, classified as outcome u.

Returning to the original data set, the process is repeated for another outcome p different from u. Once all groups for all outcomes have been identified, a precision decision tree is built. This is used to make future decisions as follows. Upon receiving a new object, begin checking groups to determine if the new object matches the attributes of a group. If a match is found to a group with outcome u, then assume the new object will have outcome u, make the appropriate decision, and terminate the algorithm. If all groups are searched and no match is found, the object is declared as unclassified.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

In addition to the following discussion and description, details of one preferred embodiment of the present invention are further described and disclosed in Appendix A, titled "Using Graphs to Guide Induction for Decision Trees", Appendix B, titled "Precision Decision Trees", and Appendix C, titled "Recommender Example", all of which appendices are attached herewith and hereby incorporated in their entirety by reference.

Figure 1:
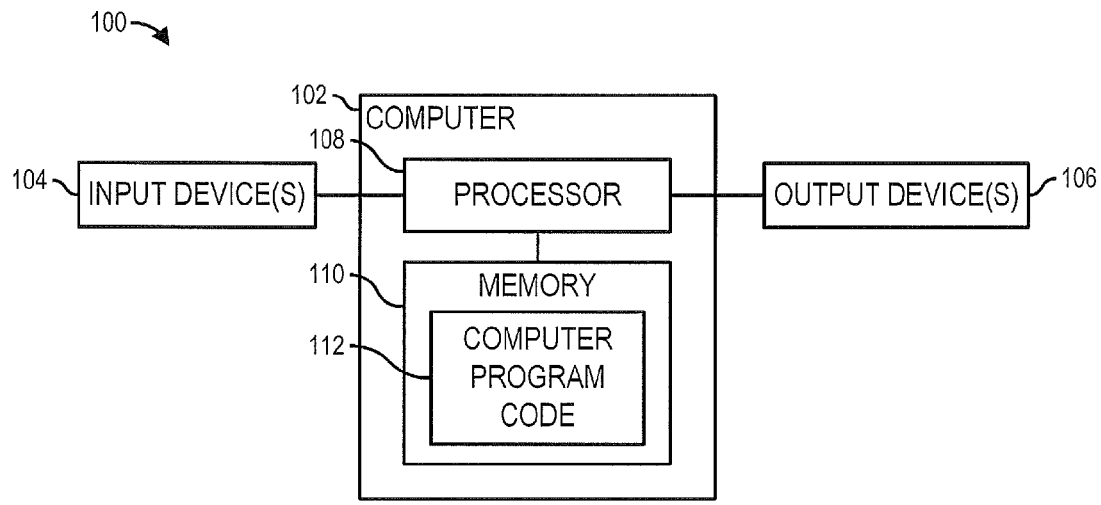
FIG. 1 is a block diagram exemplifying hardware effective for implementing features of the present invention.

Referring to FIG. 1 of the drawings, the reference numeral 100 generally designates a computer system effective for implementing features of the present invention. The system 100 includes a computer 102 coupled to one or more input devices (e.g., keyboard, mouse, and the like) 104 and one or more output devices (e.g., display, printer, and the like) 106. The computer 102 preferably includes at least a processor 108 and memory 110. The memory 110 is effective for storing computer program code 112 executable by the processor 108 for performing features of the invention. The computer program code 112 is preferably effective for executing steps described in further detail below with respect to FIG. 5.

Figure 2:
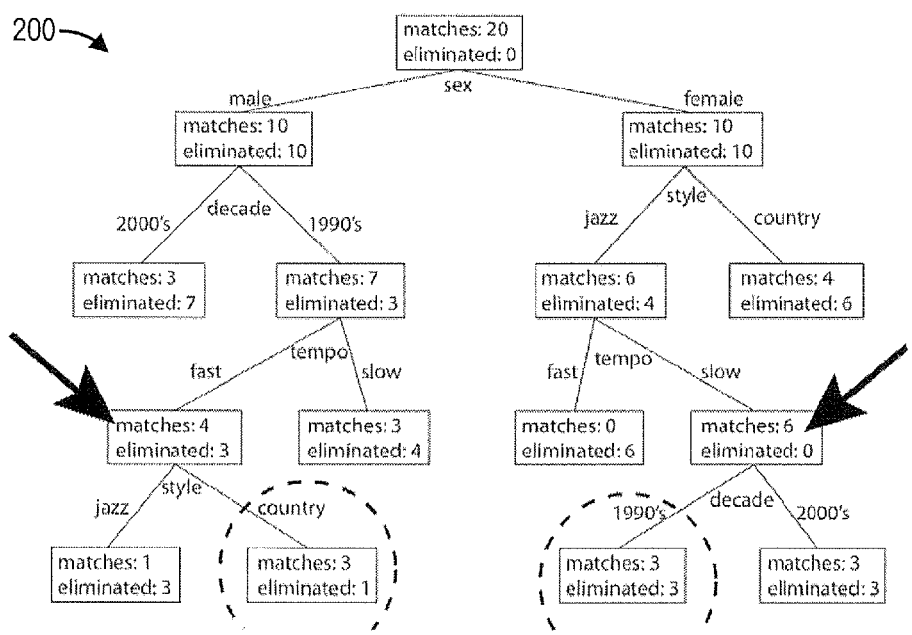
FIG. 2 depicts a decision tree often used in accordance with principles of the prior art.
Figure 3:
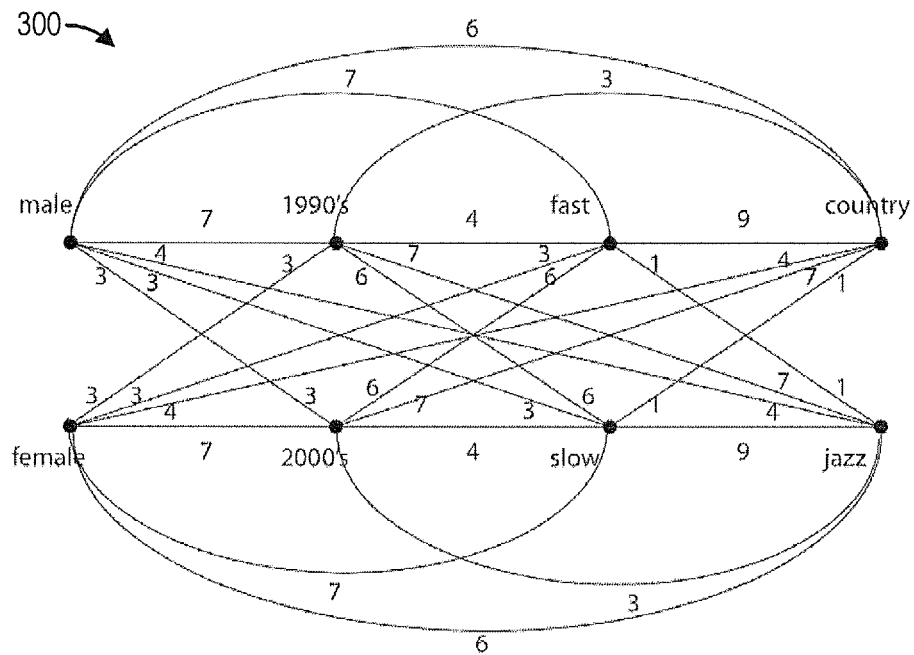
FIG. 3 exemplifies a graph (or "network") used to guide the building of a precision decision tree in accordance with principles of the present invention.

Referring to FIGS. 2 and 3 of the drawings, the reference numerals 200 and 300 generally designate a tree and graph (also referred to as a "network") embodying features of the prior art and exemplifying, without limitation, one embodiment of the present invention, respectively. The tree 200 and graph 300 correspond to the following sets of raw data:

6 country songs from the 2000's with fast tempo: 3 male, 3 female 6 jazz songs from the 1990's with slow tempo: 3 male, 3 female 3 male country songs from the 1990's with fast tempo 1 male jazz song from the 1990's with fast tempo 3 female jazz songs from the 2000's with slow tempo 1 female country song from the 2000's with slow tempo In this example, there is only one outcome: the customer purchased a song. The goal is to identify the set of 2, 3, and 4 attributes corresponding to the most songs purchased.

FIG. 2 constitutes an ordinary decision tree 200 often used to tackle such a problem. The right-hand side of the decision tree 200 ends up with a better result if it is desired to identify the largest set of songs specified by three attributes, such as decade, tempo, and style. Specifically, it identifies a song with a female artist, jazz style, and slow tempo as being purchased six times. The left-hand side of the tree 200 has an equivalent result if the attributes were considered in a different order.

In accordance with principles of the present invention, the graph 300 is developed to guide the grouping. The largest set of songs specifying three attributes matches the highest weight subgraph of three vertices in the graph 300.

For a fixed outcome u, a list of every possible combination of two attributes is created and a count is made of how many pieces of data with the attributes produce outcome u and how many produce any outcome other than u. This process, which begins at step 502 in FIG. 5, will be referred to as gathering "pairwise statistics" of the data. In the example above, there is only one outcome, so the pairwise statistics simply count how many songs were purchased for every combination of two attributes. From this data, the weighted graph 300 is produced as exemplified above, with each edge weighted using the pairwise statistics to produce a high score if the group tends to produce outcome u frequently. Suggestions for how the edges may be weighted are included in Appendix A. Instead of counting the outcomes for every possible combination of three attributes, the graph 300 is searched for a set of three attributes inducing a subgraph with high weight. If not provided with the list counting the outcomes for every possible combination of three attributes, then the graph 300 could be searched for sets of three attributes inducing a subgraph with high weight. In general, instead of creating a list counting the outcomes for every possible combination of x attributes, the graph is searched for sets of x attributes inducing a subgraph with high weight.

Figure 5:
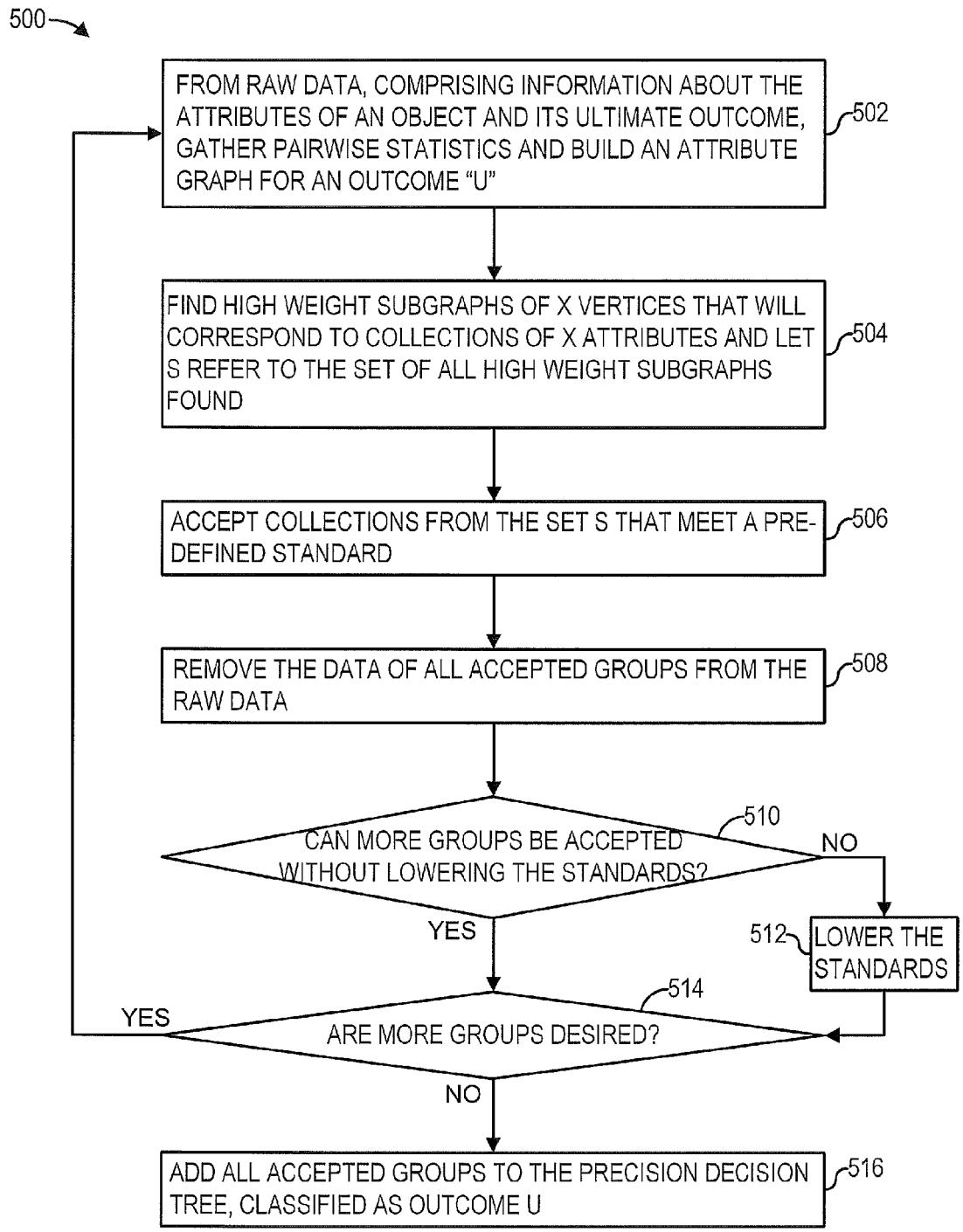
FIG. 5 exemplifies a flow chart illustrating control logic embodying features of the present invention for building the graph of FIG. 3 and the tree of FIG. 4.

At step 504 of FIG. 5, it is proposed that the highest weight graph of x vertices often corresponds to the group of x attributes producing the highest "score," referred to herein as the "best group of x attributes," "score" being defined herein in accordance with Appendix A. Assuming this is true, then in step 506, the best group of x attributes may be identified by finding the highest weight graphs of x vertices, declaring such groups to be "accepted" that meet a pre-defined standard, and in step 508, peeling away the corresponding data from the raw data. In the example above, since there is only one outcome, the standard might simply be that the group of attributes represents at least five songs. More details on standards of purity and support are discussed in Appendix A.

After accepting groups, in step 510, a determination is made whether more groups can be accepted without lowering the standards. If it is determined that more groups can be accepted without lowering the standards, then execution proceeds to step 514; otherwise, execution proceeds to step 512 wherein the standards are lowered, and then execution proceeds to step 514. At step 514, a determination is made whether more groups are desired. If it is determined that more groups are desired, then execution returns to step 502 to re-gather pairwise statistics, rebuild the graph, and then identify the next best groups of x attributes. Gathering pairwise statistics is significantly less expensive than counting the outcomes for every possible combination of x attributes, and hence the graph 300 can be rebuilt and analyzed numerous times. Thus a number of the best groups for sets of x attributes can be found without listing the outcomes for every possible combination of x attributes. If, in step 514, it is determined that no more groups are desired, then execution proceeds to step 516, wherein all accepted groups are placed as branches of a precision decision tree 400 (FIG. 4), classified as outcome u. If another outcome p not equal to u exists, then execution returns to step 502 with the new outcome p and the original data set and the whole process starts again. Upon finishing the process for all outcomes, the algorithm divides groups with mutual objects in accordance with the techniques described in the document of Appendix A, and then subsequently terminates.

A mathematically rigorous explanation of why the algorithm works is provided in Appendix A, a summary of which is included herein as follows. Suppose A is the set of n attributes corresponding to the largest group of songs and suppose there are x songs with these attributes. Let B be any other set of n attributes and let there be y songs with these attributes. It is known that B differs from A by at least one attribute v, which means the subgraphs induced by A and B in the weighted graph differ by at least n−1 edges, the edges emanating from v to the remaining attributes. Suppose the edges in the graph are weighted by the number of songs exhibiting each pair of attributes. Then if the weighted graph is built using the songs in category A and category B only, the score of the subgraph induced by A exceeds the score of the subgraph induced by B by at least (x−y)(n−1), since the difference in scores gets propagated to at least n−1 edges. When songs corresponding to other choices of n attributes are included, they may add weight to the edges of A or B. But as long as the edges are somewhat randomly distributed, it is doubtful that enough weight is added to the edges of B to make up the value (x−y)(n−1). Thus as the number of attributes n increases for a fixed data set, the likelihood that the set of n attributes corresponding to the largest group of songs A matches the highest weight graph of n vertices increases. A larger and larger gap exists between the score of A and the next best data set.

If A is not the best group of n attributes, but is a better set of n attributes than B, and there are x songs with the attributes of A, and y songs with the attributes of B, then the gap between A and B in the graph is also (x−y)(n−1). Thus if edges are somewhat randomly distributed, A should have a higher score than B. This suggests that instead of mining the graph for the highest weight subgraph of n vertices, it is mined for numerous high weight subgraphs of n vertices using heuristics before the graph is re-built. The graph is re-built; however, because false edges (edges between attributes of A from songs not in A or edges between attributes of B from songs not in B) can disguise good groups with a bad score and vice versa, re-building the graph often helps such groups bubble to the surface.

Figure 4:
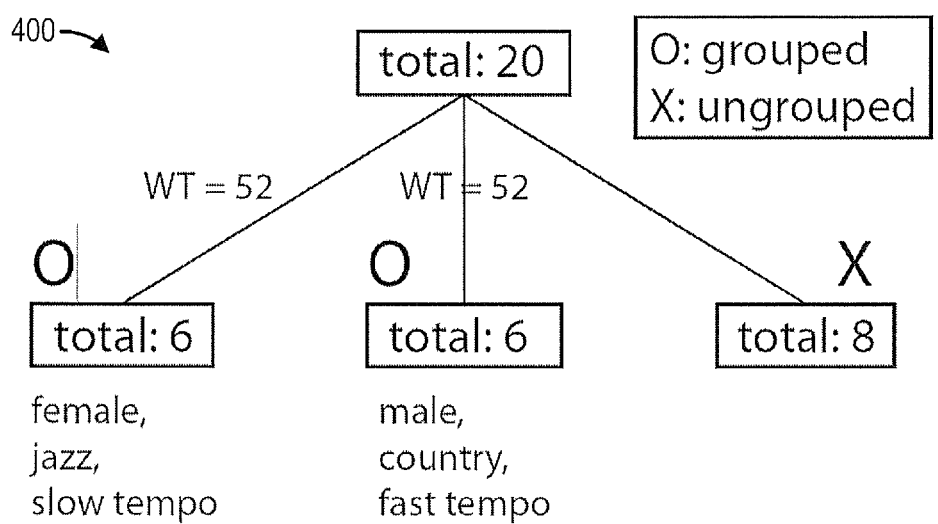
FIG. 4 exemplifies a graph/network-guided precision decision tree with multivariate splits embodying features of the present invention.

FIG. 4 exemplifies a precision decision tree 400 formed upon completion of all steps in FIG. 5. Two groups of five attributes with high weight (i.e., high count, FIG. 3) have been removed from the data set: the six female jazz songs with slow tempo and the six male country songs with fast tempo.

Once a precision decision tree is built, it may be used to make a decision by first determining if an object matches the features of any group classified with a specific outcome. If it does, then it is assumed that the object will have the same outcome and a rule is built that a computer can follow to make decisions appropriately. If it does not match the attributes of any classified group, then it is left as unclassified and no such rule is built. In the present example, a rule is built that says if a song has a female artist, slow tempo, and jazz style, then recommend it to the customer, in hopes it will be purchased like many similar songs. If a song does not match the attributes of any classified group, no rule is satisfied. Regular decision trees leave many objects unclassified too. Precision decision trees, by avoiding the fundamental flaws of regular decision trees, either leave less unclassified or have less classified incorrectly.

According to the present invention, an improved system and method is provided which has advantages over conventional decision trees with univariate splits because the invention can use graphs to assess in advance how decisions will perform multiple steps down the tree. This leads to greater precision because groups that are accepted as pure and pruned may in fact be separated and made even purer with additional attributes.

With ordinary decision trees, only a select set of groups of n attributes are considered, depending heavily on the order attributes are examined in the tree. Graphs take order out of the equation, allowing for all sets of n attributes to be considered. The only way for all groups of n attributes to be considered with ordinary decision trees is to build multiple trees so that every possible combination of n attributes is represented in some tree. Building such a large set of trees becomes quickly infeasible.

Trees with multivariate splits have similar advantages as the decision trees described herein, but are not in standard use because it is difficult to figure out good splits. The machine learning techniques often fail and so traditional decision trees are employed far more often.

It is understood that the present invention may take many forms and embodiments. Accordingly, several variations may be made in the foregoing without departing from the spirit or the scope of the invention. For example, the invention uses a graph to guide the grouping process normally done by decision trees. There are numerous ways to weight the attribute graph, so companies may try to create a graph with slightly adjusted weight to group attributes that result in a clear outcome. There are also numerous ways to score groups and numerous ways to identify groups of attributes with high weight in the weighted graph. The grouping mechanisms include cliques, clique relaxations (k-clique, k-club, k-core, k-block, quasi-clique, k-plex, k-defective clique), densest k-set, communities, and countless others.

In another variation of the invention, it may be used as a portion of a decision tree. Rather than making a tree as described above, a normal decision tree may be built for a few levels to reduce the data set, and then a precision decision tree may be built for each branch. This will allow the precision of the invention to be obtained, while not building a precision decision tree exactly as described herein. The precision trees described herein only have two levels. It is possible that splits exist that will not divide many clear groups and can give the tree more levels, thereby speeding up use of the decision tree, but the focus here is on improving how much information gets classified by decision trees rather than the speed of classifying the information. Improvements for speed are likely future variations of precision decision trees. Precision decision trees use a network to guide a multivariate split. While the multivariate splits considered in the examples give equal weight to the attributes, it is understood that the network may be used to guide multivariate splits that are linear combinations of the attributes.

It is understood that the invention may be varied by listing n attributes, but only requiring k of the attributes to be specified for some k<n. Subsequently, identifying the optimal set of x attributes would only be restricted on choosing at least one value in k different attribute categories, with freedom to specify the remaining x−k choices in any way desired. It is also understood that the invention may be varied by restrictions in many other ways, such as requiring more than one value be specified in specific attribute categories.

It is understood that there may be alternative methods that may be employed to determine how to classify mutual objects in overlapping groups other than the methods described in Appendix A. It is believed, however, that such alternative methods would be apparent to a person having ordinary skill in the art upon a review of the present disclosure and, therefore, that the present invention encompasses same.

It is still further understood that the algorithm discussed above with respect to FIG. 5 and in Appendix A can be rearranged to have steps performed in a different order. By way of example, but not limitation, one potential rearrangement is to build the attribute graphs for every possible outcome and proceed from steps 502 to 506 of FIG. 5 in unison, that is, perform step 502 for every possible outcome, then perform step 504 for every possible outcome, and then perform step 506 for every possible outcome. The algorithm described in this document performs the steps of FIG. 5 for the various outcomes sequentially. Upon reaching step 508, the raw data for all accepted groups is removed simultaneously and then the process is continued in unison. This should lead to a slight adjustment in what information is available upon a return to step 502 of the algorithm in FIG. 5.

It is noted that step 506 may be omitted, such that groups with high score are accepted without examination if they meet any standard. It if further noted that step 508 may be omitted if more groups are desired and it is unnecessary to peel away data to reveal such groups. This occurs when inadequate time was spent in step 504 of the algorithm and does not constitute a deviation from the present algorithm.

It is noted that a significant distinction of the present invention over the prior art is that, because the attribute graph is designed for supervised data mining, where there is a defined outcome for all the training data, the attribute graph may be used to "boost" decision trees. That is, an ordinary decision tree algorithm is run, and for whatever data is classified incorrectly, the attribute graph may be used to help identify where to look to find groups that classify this data correctly. A voting scheme is then created and it is hoped that, with enough groups, the correct classification wins out for each of the pieces of data, since clear groups were specifically identified to correct misclassifications. This improves the accuracy of decision trees, the goal of the present invention.

The preferred way to use the algorithm of the present invention is to "boost" ordinary decision trees, or an alternative classifier algorithm, as discussed in the final paragraph of Section 5 ("A Method for Building A Graph Guided Rule-Based Classifier") of Appendix A. There, it suggests fixing a couple of attributes to match the values of the incorrectly classified piece of data before building an attribute graph on the remaining attributes and doing the steps in FIG. 5. Thus the loop in FIG. 5 is only in charge of picking some of the attributes, and even for those it is forced to choose the values of the pieces of data which we desire to classify correctly among its choices. The details are all discussed in the aforementioned paragraph in the paper of Appendix A, which also discusses the purpose for these additional steps when using the algorithm of the present invention to "boost" the results of an ordinary decision tree algorithm.

The prior art, such as CLICKS, disclosed in an article titled "CLICKS: An Effective Algorithm for Mining Subspace Clusters in Categorical Datasets" by Zaki et. al., would never have considered using the attribute graph of the present invention as a tool to look for the best group to classify correctly a single piece of data, because CLICKS focuses on solving unsupervised data mining problems. In unsupervised data mining, no "correct" classification exists because data is not assigned an outcome. Because CLICKS does not need to find correct groups for every single piece of data, it does not need to loop through and peel away data and rebuild the attribute graph, which helps reveal groups that were previously hidden. CLICKS is not concerned with finding these hidden groups to help classify every piece of data, but simply those groups with high support. This is why CLICKS makes no suggestion even remotely similar to the loop in FIG. 5, because peeling away data only reveals groups with much lower support, which CLICKS does not care about. Thus the loop in FIG. 5 is unique to the algorithm of the present invention, and is necessary because the attribute graph is being used for the supervised setting.

A number of other features and embodiments are discussed under "Extensions & Future Work", Section 5 in Appendix A, including a hypergraph that uses deeper statistics than "pairwise statistics." None depart from the spirit or scope of the present invention and are included as part of the invention.

The invention also has numerous applications and could change the way statistics are taken in many circumstances. In Appendix A, it is shown that pairwise statistics paired with a graph are fundamentally better than disjoint statistics, which is the way statistics are often taken at present. Because of this, applications include identifying sets of attributes that correspond to good sports players, identifying credit risk of a credit card applicant, and improving recommenders to recognize the attributes of the items purchased by a specific customer among others. IBM lists market research, database marketing, marketing in the public sector, and program targeting among some of the applications for their decision trees. In a paper titled "Automatic Construction of Decision Trees from Data: A Multi-Disciplinary Survey" by Sreerama K. Murthy, there are listed eighteen different fields to which decision trees contribute. The solutions to all of these problems may be enhanced with precision decision trees.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for making a decision, the method comprising steps of:
   - gathering from raw data pairwise statistics and building an attribute graph for an outcome u, the raw data comprising information about the attributes of an object and its ultimate outcome;
   - finding high weight subgraphs of x vertices that will correspond to collections of x attributes, wherein S refers to the set of all high weight subgraphs found;
   - determining whether more groups are desired;
   - upon a determination that more groups are desired, returning to the step of finding;
   - upon a determination that more groups are not desired, adding all accepted groups to a precision decision tree, the accepted groups being classified as outcome u; and
   - making a decision using the precision decision tree.

2. The method of claim 1, further comprising the steps of:
   - accepting collections from the set S that meet a pre-defined standard;
   - determining whether more groups can be accepted without lowering the standards; and
   - upon a determination that more groups cannot be accepted without lowering the standards, lowering the standards.

3. The method of claim 1, further comprising the steps of removing data of all accepted groups from the raw data, and gathering pairwise statistics and repeating the steps of the method.

4. A system for making a decision, the system including a computer having at least a processor and a memory operably coupled to the processor, the memory being configured for storing a computer program executable by the processor, the computer program comprising:
   - computer program code for gathering from raw data pairwise statistics and building an attribute graph for an outcome u, the raw data comprising information about the attributes of an object and its ultimate outcome;
   - computer program code for finding high weight subgraphs of x vertices that will correspond to collections of x attributes, wherein S refers to the set of all high weight subgraphs found;
   - computer program code for determining whether more groups are desired;
   - upon a determination that more groups are desired, computer program code for returning to the step of gathering;
   - upon a determination that more groups are not desired, computer program code for adding all accepted groups to a precision decision tree, the accepted groups being classified as outcome u; and
   - computer program code for making a decision using the precision decision tree.

5. The system of claim 4 wherein the computer program further comprises:
   - computer program code for accepting collections from the set S that meet a pre-defined standard;
   - computer program code for determining whether more groups can be accepted without lowering the standards; and
   - upon a determination that more groups cannot be accepted without lowering the standards, computer program code for lowering the standards.

6. The system of claim 4 wherein the computer program further comprises:
   - computer program code for removing data of all accepted groups from the raw data; and
   - computer program code for returning to the step of gathering.

7. A system for making a decision, the system including a computer having at least a processor and a memory operably coupled to the processor, the memory being configured for storing a computer program executable by the processor, the computer program comprising:
   - computer program code for gathering from raw data pairwise statistics and building an attribute graph for an outcome u, the raw data comprising information about the attributes of an object and its ultimate outcome;
   - computer program code for finding high weight subgraphs of x vertices that will correspond to collections of x attributes, wherein S refers to the set of all high weight subgraphs found;
   - computer program code for determining whether more groups are not desired; and
   - upon a determination that more groups are not desired, computer program code for adding all accepted groups to a precision decision tree, classified as outcome u.

* * * * *